United States Patent
Brignull et al.

(10) Patent No.: US 8,626,615 B2
(45) Date of Patent: Jan. 7, 2014

(54) SYSTEM AND METHOD FOR PRODUCT TRIALS IN A SIMULATED ENVIRONMENT

(75) Inventors: Michele P. Brignull, Essex Junction, VT (US); Rick A. Hamilton, II, Charlottesville, VA (US); Anne R. Sand, Peyton, CO (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 12/325,453

(22) Filed: Dec. 1, 2008

(65) Prior Publication Data
US 2010/0138305 A1 Jun. 3, 2010

(51) Int. Cl.
*G06Q 10/00* (2012.01)
*G06Q 30/00* (2012.01)

(52) U.S. Cl.
USPC .............................................. 705/28; 705/23

(58) Field of Classification Search
USPC .......................................................... 705/28
See application file for complete search history.

(56) References Cited

U.S. PATENT DOCUMENTS

| | | | |
|---|---|---|---|
| 5,842,199 A | 11/1998 | Miller et al. | |
| 6,026,376 A | 2/2000 | Kenney | |
| 6,313,745 B1 * | 11/2001 | Suzuki | 340/572.1 |
| 6,381,583 B1 | 4/2002 | Kenney | |
| 6,604,239 B1 | 8/2003 | Kohen | |
| 8,069,168 B2 | 11/2011 | Fitzpatrick et al. | |
| 2002/0161651 A1 | 10/2002 | Godsey et al. | |
| 2002/0169665 A1 * | 11/2002 | Hughes et al. | 705/14 |
| 2005/0179685 A1 | 8/2005 | Kake et al. | |
| 2005/0216346 A1 | 9/2005 | Kusumoto et al. | |
| 2005/0251461 A1 | 11/2005 | Nykamp | |
| 2005/0251462 A1 | 11/2005 | Nykamp | |
| 2006/0111189 A1 | 5/2006 | Winkler | |
| 2006/0155615 A1 | 7/2006 | Loo et al. | |
| 2006/0230141 A1 | 10/2006 | Willis | |
| 2007/0055563 A1 | 3/2007 | Godsey et al. | |
| 2007/0067220 A1 | 3/2007 | Godsey et al. | |
| 2007/0067222 A1 * | 3/2007 | Godsey et al. | 705/23 |
| 2007/0129956 A1 | 6/2007 | Stinski | |
| 2007/0150387 A1 * | 6/2007 | Seubert et al. | 705/31 |
| 2007/0260520 A1 | 11/2007 | Jha et al. | |
| 2008/0201321 A1 | 8/2008 | Fitzpatrick et al. | |
| 2009/0094517 A1 | 4/2009 | Brody et al. | |
| 2009/0201299 A1 * | 8/2009 | Bhogal et al. | 345/474 |
| 2009/0282472 A1 * | 11/2009 | Hamilton et al. | 726/15 |
| 2010/0037147 A1 * | 2/2010 | Champion et al. | 715/751 |
| 2010/0131355 A1 | 5/2010 | Kitchen et al. | |

OTHER PUBLICATIONS

Notice of Allowance dated May 15, 2012 in U.S. Appl. No. 12/328,405.

* cited by examiner

*Primary Examiner* — Garcia Ade
(74) *Attorney, Agent, or Firm* — Lisa Ulrich; Roberts Mlotkowski Safran & Cole, P.C.

(57) ABSTRACT

A system and method to enable product trials and, in particular, to dynamically collect information relating to the product trials. The system includes a tagging engine configured to tag one or more products, which are part of a product trial in a virtual universe. The system also includes a tracking engine configured to track information on the one or more products via a tag and a storage unit configured to collect the tracked information for marketing and/or advertising purposes.

27 Claims, 4 Drawing Sheets

| Timestamp | Location | Action |
|---|---|---|
| 12/7/2008 13:43 | Green Island/Store #1 | Item taken for trial |
| 12/9/2008 4:10 | Red Island/Meeting Hall | Item used for 15 minutes |
| 12/10/2008 5:55 | Concert Hall | Item color changed to blue |

SYSTEM AND METHOD FOR PRODUCT TRIALS IN A SIMULATED ENVIRONMENT

FIELD OF THE INVENTION

The invention generally relates to a system and method for enabling product trials and, in particular, to dynamically collect information relating to the product trials.

BACKGROUND OF THE INVENTION

A virtual universe (VU) is an interactive simulated environment accessed by multiple users through an online interface. Users inhabit and interact in the VU via avatars, which are a user's representation of himself or herself. These representations can be in the form of a three-dimensional model, a two-dimensional icon, a text construct, a user screen name, etc. Although there are many different types of VUs, there are several features many VUs generally have in common. These features include, for example, Shared Space: the VU allows many users to participate at once;

Graphical User Interface: the VU depicts space visually, ranging in style from 2D "cartoon" imagery to more immersive 3D environments;

Immediacy: interaction takes place in real time;

Interactivity: the VU allows users to alter, develop, build, or submit customized content;

Persistence: the VU's existence continues regardless of whether individual users are logged in; and Socialization/Community: the VU allows and encourages the formation of social groups such as teams, guilds, clubs, cliques, housemates, neighborhoods, etc.

Many real world interactions can occur within a VU. For example, users in a VU can work, vacation, and even shop for goods and/or services within a VU. As VUs become more popular, the number of users purchasing goods and/or services in VUs has continued to increase. This increase has brought with it the need for businesses to develop marketing and advertising strategies to effectively reach users that are participating in a VU.

Businesses have traditionally marketed and advertised products to possible consumers in the real world using methods such as conducting questionnaires, tracking coupon usage, and conducting telephone surveys. While these methods provide some statistical data for marketers, these methods provide little to no information on why people use a product, when the product is being used, and/or how people are using the product. Without answers to these questions, businesses must make a number of assumptions as to the effectiveness of a product, how much consumer interest a product has, and how long to keep a product on the market. This information is important in the real world and especially in VUs where opinions about products as well as product trends can occur quickly and spread easily throughout the VU. As such, it is important to obtain accurate information on products to develop effective marketing and/or advertising strategies for products in the real world as well as product in VUs.

SUMMARY OF THE INVENTION

In a first aspect of the invention, a system comprises a tagging engine configured to tag one or more products, which are part of a product trial in a virtual universe. The system also includes a tracking engine configured to track information on the one or more products via a tag and a storage unit configured to collect the tracked information.

In another aspect of the invention, a method for tracking product trials in a virtual universe comprises allowing a product in a virtual universe to be taken on a product trial and tagging the product with at least one tag. The method also comprises tracking usage of the product during the product trial via the at least one tag and collecting product trial data based on the tracking.

In another aspect of the invention, a computer program product comprising a computer usable medium having readable program code embodied in the medium is provided. The computer program product includes at least one component operable to: tag a product in a virtual universe using one or more tags, wherein at least one of the one or more tags is indicative of whether the product is part of a product trial; track usage of the product as part of the product trial via the one or more tags; and collect data about the product trial and a user taking the product on the product trial, wherein the data is configured to be used for at least one of advertising or marketing purposes.

In yet another aspect of the invention, a method for deploying an application for tracking product trials in a virtual universe, comprises providing a computer infrastructure being operable to: determine whether to permit a product in a virtual universe to be taken on a product trial; tag the product in the product trial with at least one tag; track usage of the product during the product trial via the at least one tag; and collect product trial data based on the tracked usage.

BRIEF DESCRIPTION OF THE DRAWINGS

The present invention is described in the detailed description which follows, in reference to the noted plurality of drawings by way of non-limiting examples of exemplary embodiments of the present invention.

FIG. 3 shows an exemplary database table comprising tracked product trial data in accordance with aspects of the invention.

DETAILED DESCRIPTION OF THE INVENTION

Figure 1:
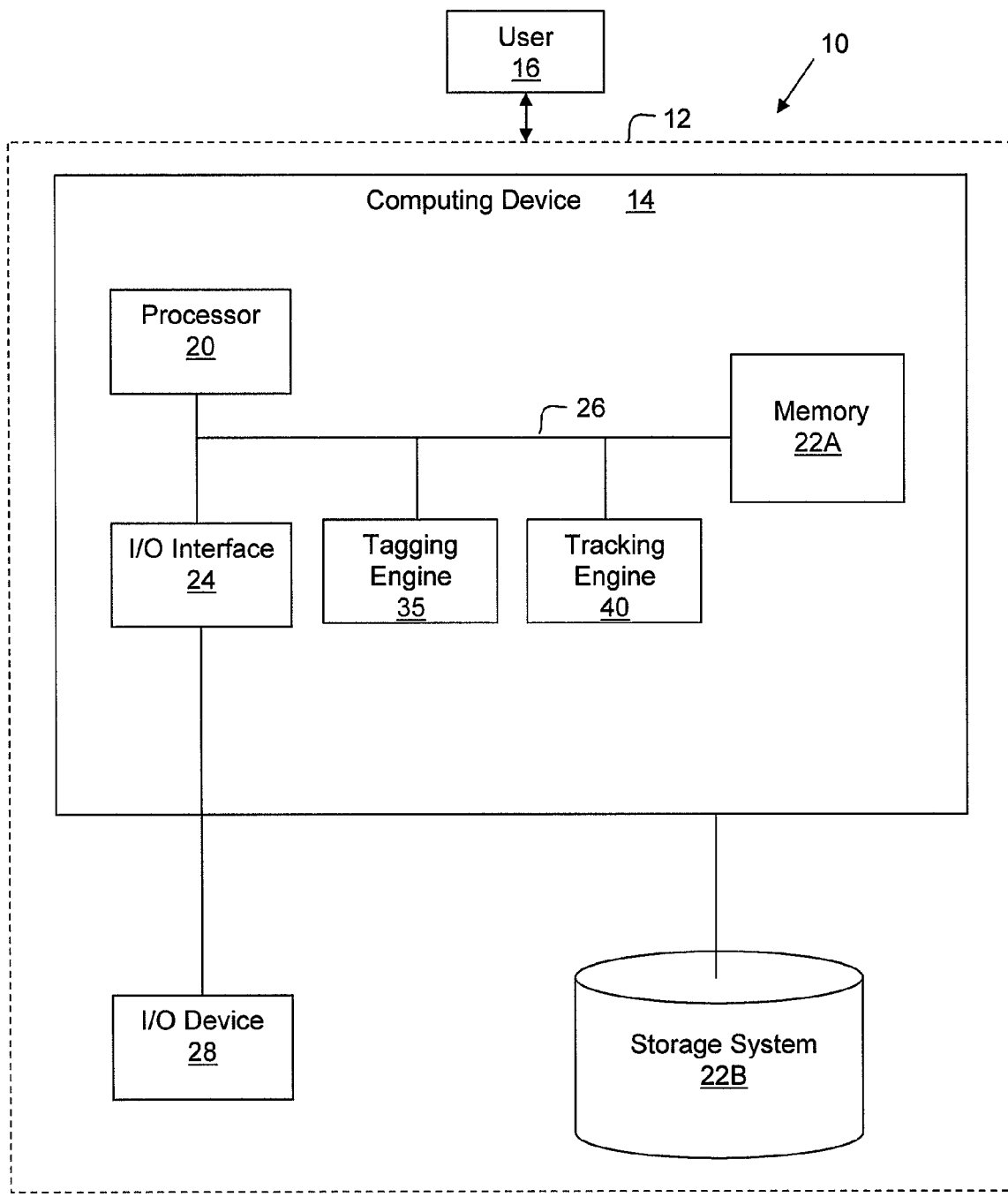
FIG. 1 shows an illustrative environment for implementing the steps in accordance with the invention.

The invention is directed to a system and method for enabling product trials and, in particular, to dynamically collect data relating to the product trials. More specifically, the present invention provides a method for test marketing products within a VU by giving VU users the opportunity to take and use one or more products within a VU for a specified period of time and/or for a specified number of uses. The products may be taken on trial for free by those wanting to participate in the product trial or a fee may be charged to the user for taking a product on trial. In embodiments, users may be rewarded for participating in the trial program by being able to keep the trial unit and/or receiving virtual and/or real world rewards, etc.

Items that are taken on trial, or for a "test drive", may include an identifier tag. The identifier tag may be used, e.g., to identify a product as one that may be borrowed from a VU store, kiosk, etc., before purchasing the product. The tag may be used to dynamically collect product usage data and trend data relating to where the user's avatar goes with the product, how it is used, who uses it, when it used, etc. For example, the tag identifier could be used to track locations the user visited prior to entering into a VU store, products purchased in previously visited locations, general shopping habits, modifications made to the product once taken on trial, etc.

Data collected by the identifier tag can be tracked during the trial and the results of the collected trial data may be provided to vendors, manufacturers, advertisers, etc., for free, at a cost, or on a subscription fee basis. This data may be used to provide, e.g., targeted advertisements to the individual taking the trial. Embodiments may also aggregate the trial data and use it to market to large groups of similar users. Aggregated data may also be used, in embodiments, to help businesses make decisions regarding the product itself, such as, e.g., how long to market the product, where the product should be marketed, what demographic to market the product to, etc. This information may be used in VUs and in the real world.

Thus, the present invention equips VU and real world vendors, manufacturers, advertisers, etc., with a comprehensive profile of their customers and provides them with insight on how their product is actually being used, as opposed to how they think the product is being used.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM),
an optical storage device, and/or
a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a Tagging Engine 35, which makes computing device 14 operable to tag a product taken on trial by a user 16. The computing device 14 also comprises a Tracking Engine 40, which makes computing device 14 operable to track user information and product information relating to one or more products that are taken on trial by the user 16, in accordance with the invention, e.g., process described herein.

While the Tagging Engine 35 and the Tracking Engine 40 are represented as separate engines, in embodiments, the Tagging Engine 35 and the Tracking Engine 40 may be comprised as a single engine. Moreover, the information tracked by the Tracking Engine 40 may be stored in a storage system 22B.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution.

The computing device 14 is in further communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, microphones, headsets, etc.

In general, the processor 20 executes computer program code, which is stored in the memory 22A and/or storage system 22B. The computer code may be representable of the functionality of the Tagging Engine 35 and the Tracking Engine 40. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the processes described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Exemplary Implementation of the System

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
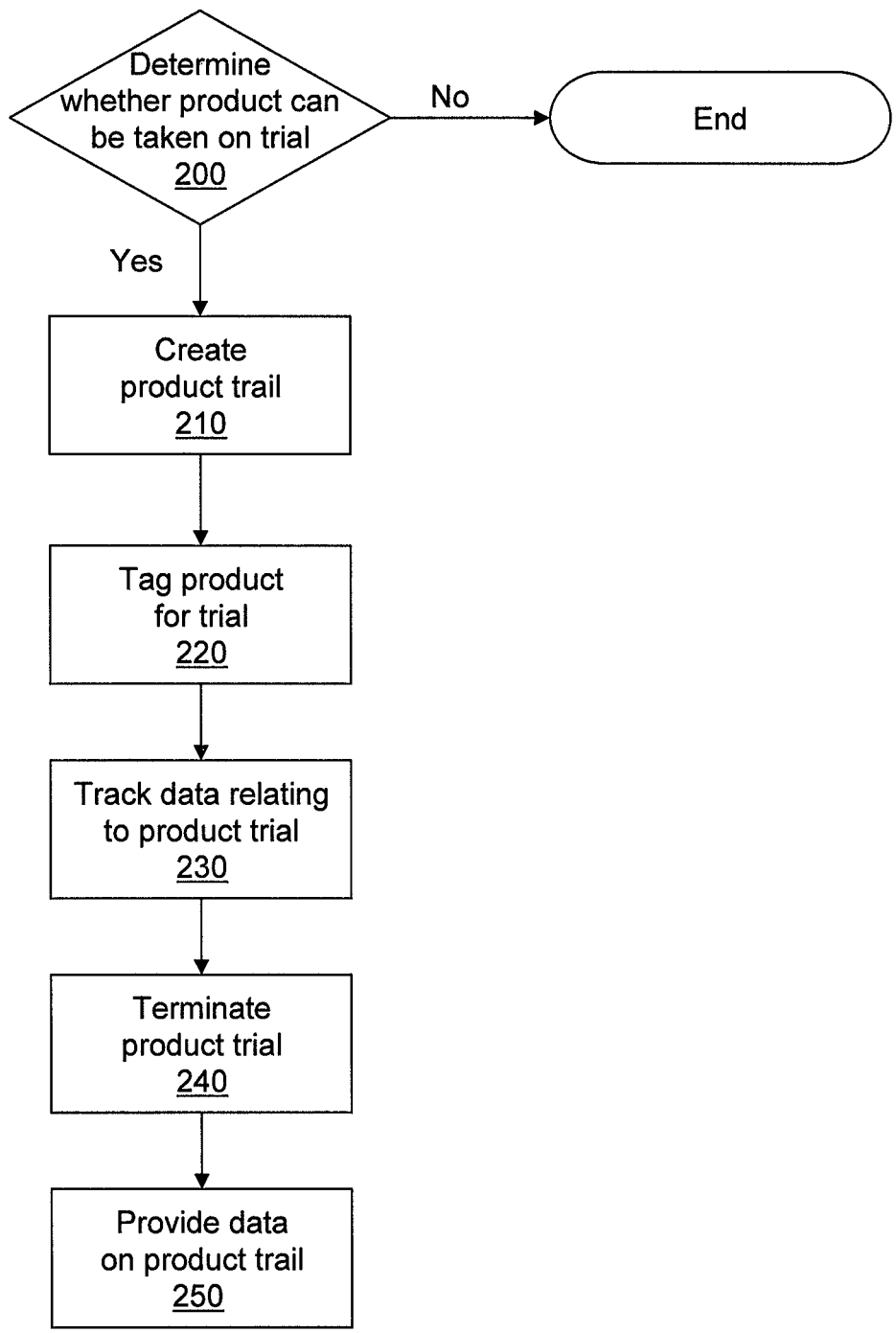
FIG. 2 shows a flow chart of an exemplary process in accordance with aspects of the invention.

Referring to FIG. 2, a determination as to whether a product can be taken on trial is performed, at step 200. This determination may be performed by looking at one or more tags associated with the product and identifying whether the product's tag permits the product to be taken on trial. In embodiments, product trials may be limited to specific products, to a limited number of users, and/or be limited to specific users within the VU. If the product tag does not permit a product trial, the user may be presented with a message indicating the product is not available for trial and/or may merely be denied access to a product trial.

If a product may be taken on trial, the product trial may be created, at step 210. A product trial may be created by allowing a user to select the product trial from a vendor, manufacturer, advertiser, etc., using any number of selection processes known to those of skill in the art. A product trial may also be created by allowing a vendor, manufacturer, advertiser, etc., to prompt a user to accept the product trial while the user is participating in the VU. Moreover, in embodiments, a product trial may also be created by allowing a vendor to proactively place a product into a user's inventory with or without the user's request.

A product may also be created by allowing a user's avatar to request a clone of a product that a second avatar has on trial and/or has purchased from a virtual vendor. This clone may be created with or without the approval of a vendor, manufacturer, advertiser, etc. The process of creating a clone of the product may include, for example, copying the product along with one or more tags that are associated with the product. In embodiments, any tags that link the second avatar to the product may be removed and/or replaced with one or more new tags, which link or associate the new user with the cloned product. Any number of these tags may be linked back to a vendor, manufacturer, advertiser, etc., and be used to track information on the user's product trial.

The product trial may include a number of terms and/or agreements, which may be dispositive in determining how long the product trial can last, how many times the user may take a specific and/or related product on trial, how many times the product trial may be renewed, etc. The product trial may also include a termination agreement, such that the trial product may be ended if the user attempts to misuse the product and/or disparages the product. In embodiments, the product trial may also include features that prevent the user from copying, removing tags, and or stealing the product (e.g., write protections). These features can be implemented by a programmer having ordinary skill in the art and, as such, no further description is necessary herein.

A product that is taken on trial can include one or more tags, at step 220. A tag is metadata, i.e., data about data, which may be added by any one or more vendors, distributors, retail providers, users, etc., via the Tagging Engine. Tags may also be added by any number of additional entities that come into contact with the product that is on trial. For example, a tag may include a name value, such as the borrower's name. A tag may also include the time the product trial began, when the product trial is set to expire, any modifications that may be performed on the product, etc.

Any number of tags may be associated with the product and/or user taking the product on trial. These tags may be used to dynamically collect data about where the avatar goes with the product, how it is used, who uses it, when it is used, how much it is used, what features of the product are used, etc. Tags may also be used to track the location that a product is used at and/or one or more circumstances that surround the use of the product. A tag may also be used to track what other products were used when the product on trial was used and/or who the user interacted with when using the product. In embodiments, modifications that may have been made to the product as well as who made the modification and when the modifications were made, etc., may also be tracked. Moreover, tags may be used to keep track of the state of a product, e.g., whether the product is in use, in inventory, has been returned, has been cloned, etc. One or more of the tags, which are associated with the product and/or the user taking the product on trial, may be tracked, at step 230. The information may be tracked throughout one or more VUs by the Tracking Engine by periodically pulling information from the product on trial. Optionally, in embodiments, the product on trial may include a software agent configured to report or push information to the Tracking Engine regarding the status, changes, configuration, usage, etc., of the product on trial.

Information about a product on trial and/or the user taking the product on trial may be tracked periodically or on an event driven basis. For example, in embodiments, a product may be tracked whenever the product is in use or being displayed by a user, i.e., whenever the product is in the possession of a user but is not in the user's inventory. Placing the product back into inventory, or otherwise removing the product from the user's possession can be used to disable tracking by the Tracking Engine.

Information about modifications to a product, which have been dynamically performed during a product trial, may also be tracked by the Tracking Engine. In embodiments, vendors, manufacturers, advertisers, etc., may provide for automatic modification of a product during the trial period based on one or more preset rules. Product modification may include product upgrades or downgrades based on, e.g., the user's status. Thus, a user that frequently uses a product may receive an automatic upgrade, whereas a user who keeps the product in inventory may have the product automatically downgraded. In embodiments, these modifications may be represented as tags by the Tagging Engine.

Product modifications may also be used to provide the user with additional functionality during the product trial based on how the user has been using the product. For example, an audio device may be taken on trial and may contain a set list of audio clips, as well as controls for volume, balance, bass, and treble. If the user taking the audio device on trial performs what is considered an advanced function such as, e.g., modifying the play list, or adjusting bass and/or treble preferences, the user may be categorized as an advanced user. This categorization may allow the user to have access to advanced functions such as, e.g., a full audio equalizer. Moreover, in embodiments, the Tracking Engine may automatically detect and categorize one or more user based on active versus passive usage patterns, and separate trial data evaluation for basic and advanced users.

In addition to automatic modifications, the present invention allows one or more users to independently make modifications to a product on trial. In embodiments, modifications may be performed by any user that has a product on trial or may be limited based on a customer's status, the amount a customer has spent in a VU, etc. The types of modifications may be unlimited and permit users to change one or more product attributes, e.g., change the color of a product, combine features of one or more products, etc. However, in embodiments, there may be limits on the types of modifications that may be performed to keep the user from copying and/or stealing the product (e.g., write protection). Moreover, in embodiments, certain features may be non-modifiable, such as trademarks, so as to prevent disparagement of a product or a product identifier.

Information that is tracked by the Tracking Engine may be stored in a relation database application (RDB) such as storage system 22B. This allows for categorization, field separation, and scalability of the invention and also provides ease of data access and correlation using industry standard tools. Additionally, queries utilizing industry standards (such as SQL), as well as additional tools, may be used to provide functions relating to viewing, merging, associating, summarizing, and mining data, etc. As should be understood by those of skill in the art, the flexibility of database and table layout, key, and indexing schemes in RDB applications make them desirable for a wide variety of formatted data storage, analysis, tracking, and discovery requirements.

A product trial may terminate, at step 240. The termination of the product trial may occur when the user purchases the product, the product is returned during and/or at the end of the trial period, the product is deactivated, disabled, or destroyed, and/or when the user is prompted to terminate the trial, etc. In embodiments, the product trial may also be terminated when the product is given, at no charge or for a fee, to the user for participating in the product trial. In those instances where the user maintains possession of the product at the end of the product trial, the user may be able to retain the modifications that were made to the product during the product trial.

In embodiments, the user may be able to purchase a real world product based on the product trial. For example, a user taking a product trial of a personal digital assistant (PDA) in a VU, may decide that he/she likes the product and would like to purchase a real world version of the PDA at the market price or at a reduced price for having participated in the product trial. Moreover, in embodiments, the user may have the option of purchasing a real world product having one or more of the modifications that were made to the product during the product trial, thereby allowing the user to customize a real world product based on virtual experiences with the product.

Data on the product trial may be provided to vendors, manufacturers, advertisers, etc., at step 250. In embodiments, the data may be provided after one or more product trials have been completed or while one or more product trial are still being conducted. The information collected from one or more of the product trials may be taken individually or aggregated and used to provide insight to vendors, manufacturers, advertisers, etc., about how the product is actually used, versus how they think it will be used, or how other means of market research indicate that it may be used. Additionally, this information may be used to provide mass marketing strategies to better market and advertise products.

FIG. 3 is an exemplary illustration of a database table, which comprises data that has been tracked about a product on trial, in accordance with embodiments of the present invention. The table may include, e.g., a column indicating the time a product was used in a VU, at column 300. The table may also include information on the location that the product was used, at column 310. Moreover, the table may include the type of action that occurred when the product was used, at column 320. For example, at 13:43 on Mar. 7, 2008, a product may be taken on trial from store #1 on Green Island.

Figure 4:
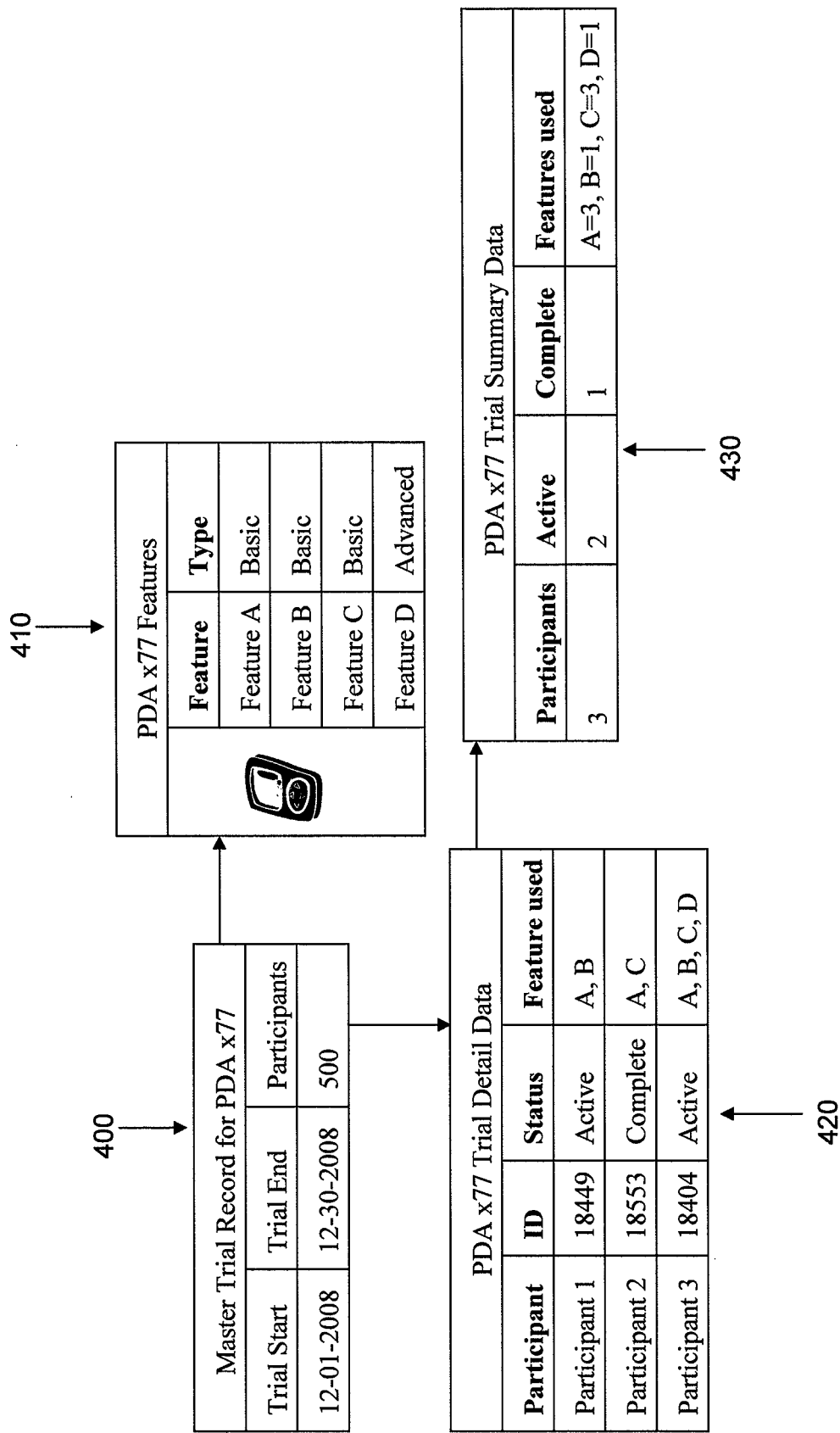
FIG. 4 shows an exemplary relational database application (RDB) table layout in accordance with aspects of the invention.

FIG. 4 is an illustrative example of a RDB database table layout according to embodiments of the present invention. More specifically, FIG. 4 includes a master trial record for a product, at table 400. This table may include data on when a product trial began, when the product data is scheduled to end, and/or the number of participants in the product trial, etc. In embodiments, the number of participants in a product trial may be limited or available to any number of users wanting to participate in the product trial.

FIG. 4 also includes a list of product features, at table 410. The product features may be identified by, e.g., a feature name and a feature type. For example, a PDA being taken on a product trial may include basic features "A", "B", and "C", which may be available to certain users. However, the same PDA may include advanced feature "D", which may be made available to a subset of the users participating in the product trial.

Detailed data on a product trial may be tracked in the database, at table 420. In embodiments, this detail data may include a user name, user identifier, user status, and/or which features are being used by the user, etc. Thus, it can be determined which users still have a product on trial and which users have ended their product trials. Moreover, it can be determined which features are being used and/or which features were used during the product trial.

Data on a product trial can be aggregated and summarized, at table 430. For example, information on the total number of users that participated in the product trial can be tracked along with a break down of how many of the total participating users are still participating in the product trial and how many have completed the product trial. Moreover, the aggregated data may include a summary of which features were used by the users while taking the product on trial. This data may be used, e.g., to better understand what product features are being used and to help marketers and advertisers provide better marketing and/or advertising for the products in the VU as well as in the real world.

While the invention has been described in terms of embodiments, those skilled in the art will recognize that the invention can be practiced with modifications and in the spirit and scope of the appended claims. Additionally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A system comprising:
    a tagging engine configured to provide a tag to one or more products being marketed as part of a product trial in a virtual universe;
    a tracking engine configured to track information on the one or more products using the tag; and
    a storage unit configured to collect the tracked information, wherein the tracked information is information pertaining to use of the one or more products in the product trial, which occurs while a user of the one or more products is traversing, inhabiting, and interacting in the virtual universe via an avatar.

2. The system of claim 1, wherein the tracking engine is further configured to track user information on one or more users including the user participating in the product trial and the storage unit is further configured to collect the tracked user information.

3. The system of claim 1, wherein the one or more products are configured to be modified during the product trial.

4. The system of claim 3, wherein the modification includes at least one of upgrading the one or more products, downgrading the one or more products, or changing at least one attribute of the one or more products.

5. The system of claim 3, wherein the modification is performed automatically based on one or more preset rules.

6. The system of claim 1, wherein the tagging engine tags at least one of a user status, a user identifier, a product trial start time, a product trial end time, and product features used during the product trial.

7. The system of claim 1, wherein the tagging engine and the tracking engine are provided on software, hardware, or a combination of software and hardware.

8. The system of claim 1, wherein the tracked information is available on a fee and subscription basis.

9. The system of claim 1, wherein the tag is configured to dynamically collect product usage data and trend data of the one or more products.

10. The system of claim 1, wherein the tag includes at least one of a name value, a product trial start time, a product trial expiration time, modification data, and status data.

11. A computer implemented method for tracking product trials in a virtual universe, comprising:

allowing a product being marketed in a virtual universe to be taken on a product trial in the virtual universe using a processor;
tagging the product with at least one tag comprising metadata;
tracking usage of the product during the product trial via the at least one tag; and
collecting product trial data based on the tracking.

12. The method of claim 11, wherein the product trial data includes product information and user information.

13. The method of claim 11, wherein the product trial data is configured to be used for advertising and/or marketing purposes.

14. The method of claim 11, wherein the tracking occurs throughout multiple virtual universes.

15. The method of claim 11, wherein the steps of claim 11 are implemented on a combination of software, hardware, or software and hardware.

16. The method of claim 11, wherein the steps of claim 11 are offered by a service provider based on one of a fee and subscription basis.

17. The method of claim 11, wherein the steps of claim 11 are at least one of supported, deployed, maintained, and created by a service provider as a computer infrastructure.

18. The method of claim 11, comprising the step of:
determining whether the product in the virtual universe is available for the product trial;
creating the product trial by allowing a user to select the product trial or by assigning the product trial to the user;
tagging the product with the at least one tag, which comprises at least one of a user status, a user identifier, a product trial start time, a product trial end time, and product features used during the product trial;
tracking the usage of the product during the product trial via the at least one tag, wherein the tracking includes tracking one or more modifications made to the product during the product trial; and
collecting product trial data based on the tracking, wherein the product trial data is configured to be used for commercial purposes.

19. A computer program product comprising a computer usable storage device having readable program code embodied in the storage device, the computer program product includes at least one component operable to:
tag a product in a virtual universe using one or more tags, wherein at least one of the one or more tags is indicative of whether the product is part of a product trial;
permit a user to take and use the product within the virtual universe for a specified period of time or for a specified number of uses based on the one or more tag;
track usage of the product as part of the product trial via the one or more tags;
collect data about the product trial and a user taking the product on the product trial, wherein the data is configured to be used for at least one of advertising or marketing purposes; and
terminate the product trial of the product at an end of the specified period of time or at the end of the specified number of uses.

20. The computer program product of claim 19, wherein the product in the product trial is configured to be modified by upgrading the product, downgrading the product, or changing at least one attribute of the product.

21. The computer program product of claim 19, wherein the computer program product is at least one of supported, deployed, maintained, and created by a service provider.

22. The method of claim 19, wherein the steps of claim 19 are offered by a service provider based on one of a fee and subscription basis.

23. The computer program product of claim 19, comprising at least one component operable to:
determine whether the product in the virtual universe is available for the product trial;
create the product trial by allowing the user to select the product trial or by assigning the product trial to the user;
tag the product with the one or more tags, which comprises at least one of a user status, a user identifier, a product trial start time, a product trial end time, and product features used during the product trial;
track the usage of the product during the product trial via the one or more tags, wherein the tracking includes tracking one or more modifications made to the product during the product trial; and
collect the data about the product trial and use the data for at least one of advertising or marketing purposes.

24. A method for deploying an application for tracking product trials in a virtual universe, comprising:
providing a computer infrastructure being operable to:
determine by a processor whether to permit a product being marketed in a virtual universe to be taken on a product trial in the virtual universe;
tag by the processor the product in the product trial with at least one tag, wherein the tag permits a user to take and use the product within the virtual universe for a specified period of time or for a specified number of uses;
track by the processor usage of the product during the product trial via the at least one tag;
collect by the processor product trial data based on the tracked usage; and
terminate by the processor the product trial of the product by the user at an end of the specified period of time or at the end of the specified number of uses,
wherein the product trial data is data pertaining to the usage of the product during the product trial, which occurs while a user of the product is traversing, inhabiting, and interacting in the virtual universe via an avatar.

25. The method of claim 24, wherein the computer infrastructure is at least one of supported, deployed, maintained, and created by a service provider.

26. The system of claim 1, wherein:
the virtual universe is an interactive simulated environment accessed by a plurality of users through an online interface such that the plurality of users can inhabit and interact in the virtual universe with avatars that are each user's representation of themselves;
the product trial comprises the user of the plurality of users taking the one or more products on trial by at least one of placing the one or more products in an inventory of the user's avatar or using the one or more products with the user's avatar; and
tracking information on the one or more products comprises, for each use, recording a time of the use, a location of use, and an action taken by the user with the product.

27. The system of claim 26, wherein:
the user's avatar requests a clone of the one or more products from another user's avatar; and
the one or more products is cloned by copying the one or more products along with the tag that is associated with the one or more products.

* * * * *